Patented Feb. 14, 1939

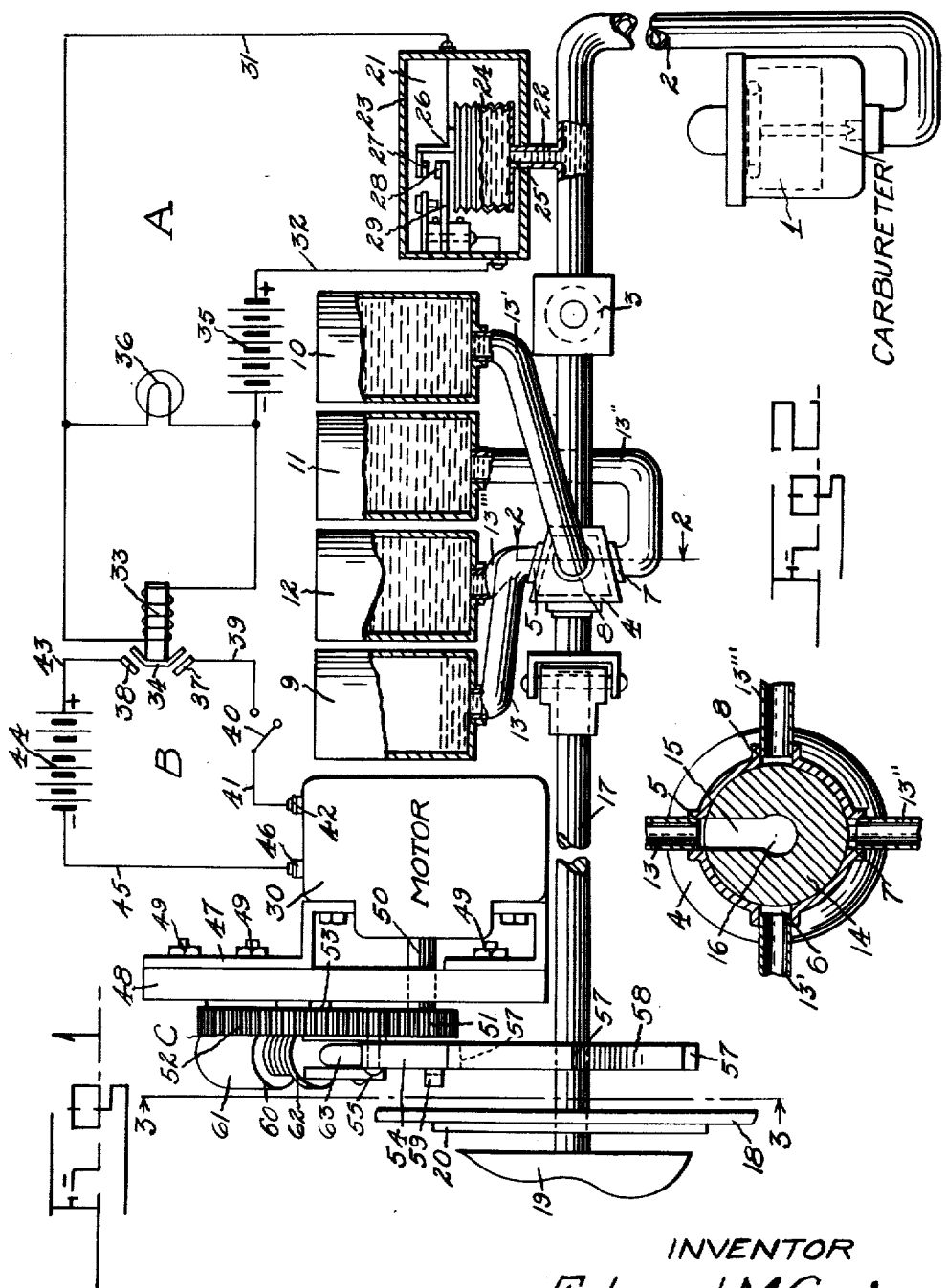

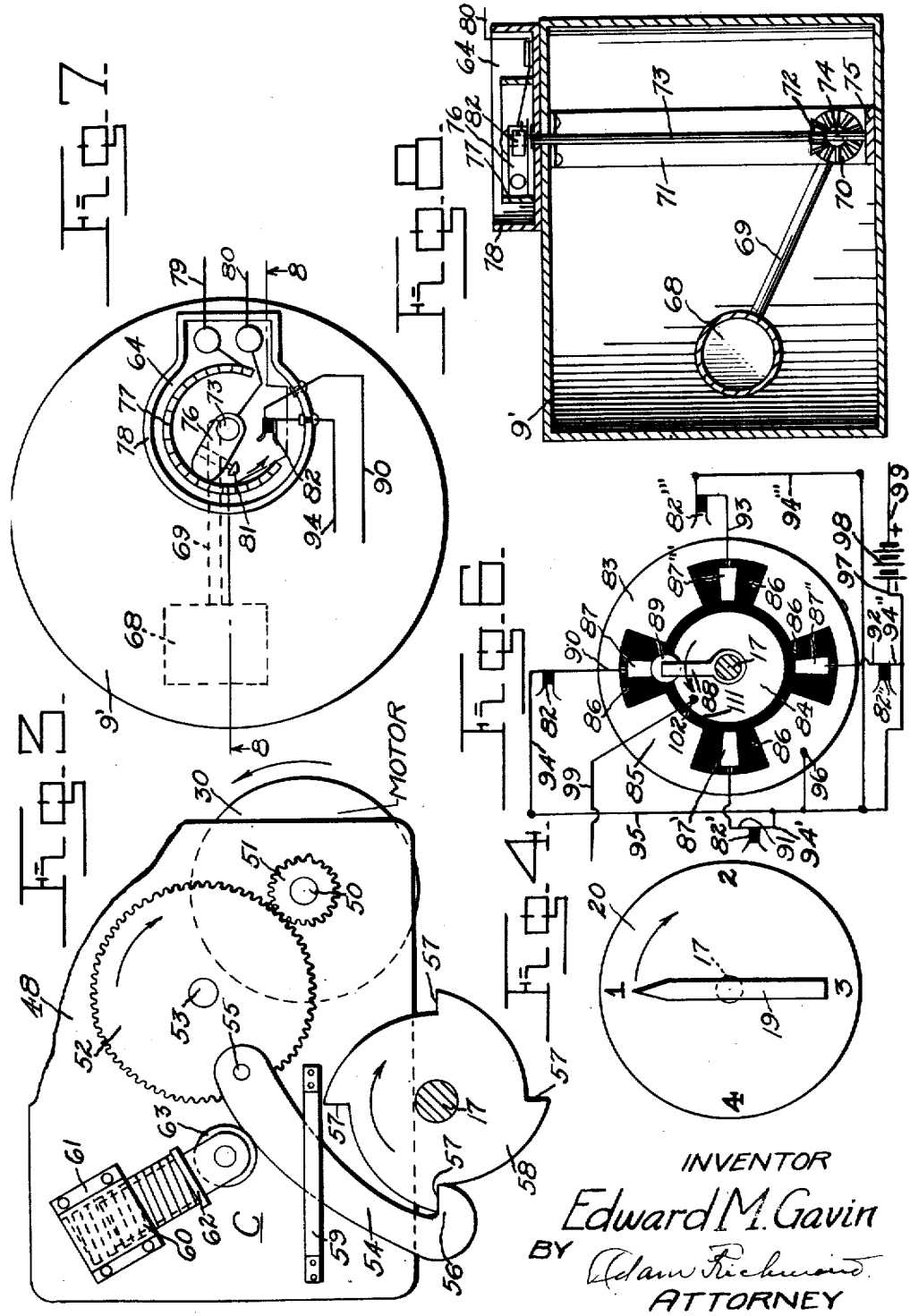

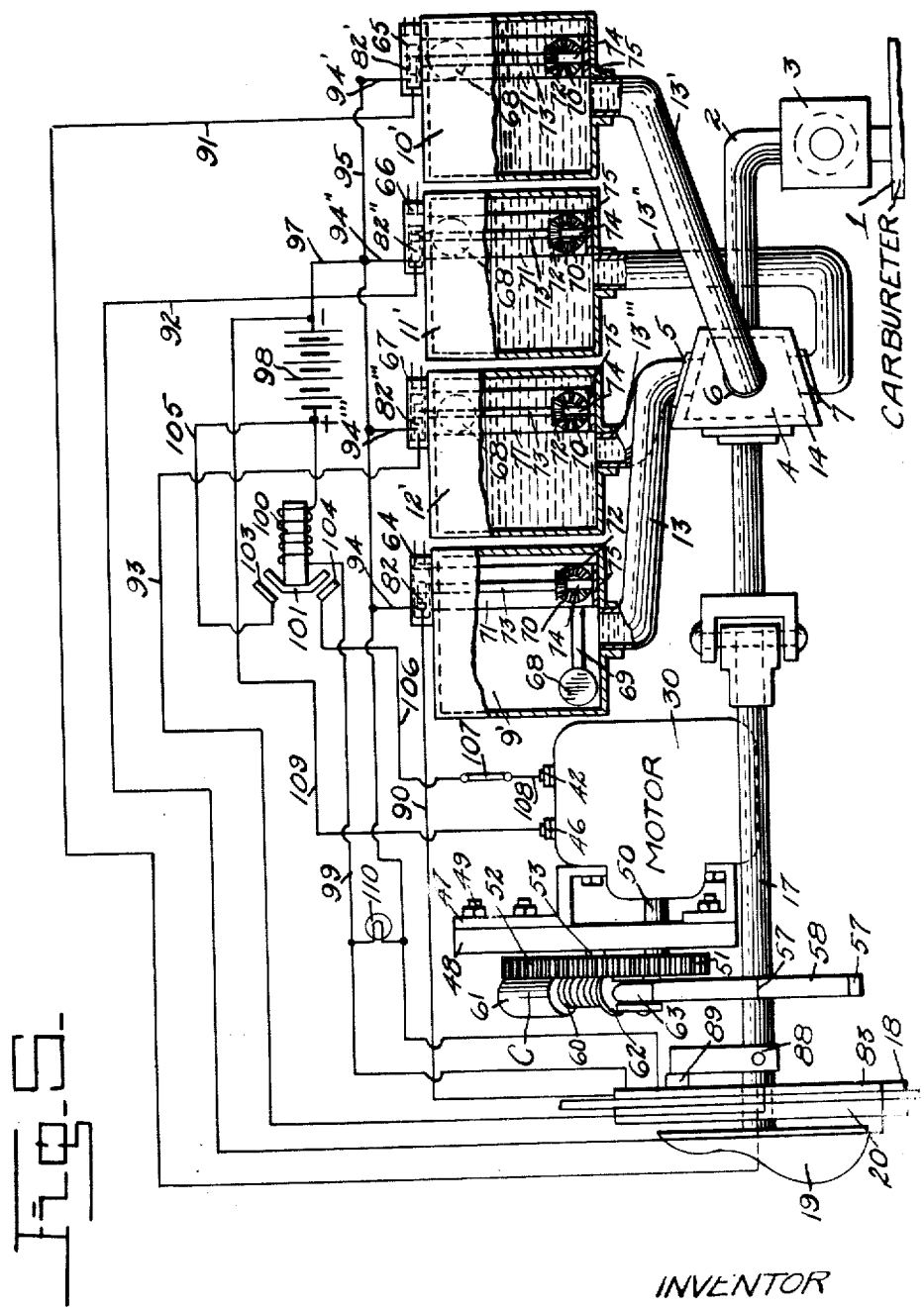

2,146,729

UNITED STATES PATENT OFFICE 2,146,729

AUTOMATIC FUEL CONTROL SYSTEM FOR VEHICLES

Edward M. Gavin, Barksdale Field, La.

Application April 11, 1938, Serial No. 201,468

15 Claims. (Cl. 158—36)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to an automatic fuel control system for vehicles; more particularly it is directed to a system of this character for use on airplanes having multiple fuel tanks.

One of the objects of the invention is to provide a fuel control system for airplanes, automobiles, launches and other vehicles having multiple fuel tanks, which is adapted to automatically cause one tank after another to be placed in communication with the carbureter of the engine of the vehicle upon a preceding tank becoming empty, or to be manually controlled for placing the tanks in communication with the carbureter.

Another object of the invention is to provide an automatic and manual fuel control system which may be readily attached to vehicles now in use, having multiple fuel tanks, which is substantially simple in construction and operation and which is durable and not liable to get out of order.

Briefly stated, this invention consists of a plurality of fuel tanks provided on a vehicle, a rotary valve adapted to cause one fuel tank and then another to be placed in communication through a fuel pump with the carbureter of the engine of the vehicle and to cut off the other tanks from communication with the carbureter, a manual control means for operating said valve, electrical and mechanical means for automatically operating the valve into communication with the fuel tanks and fuel pressure operated means for operating the electrical and mechanical means upon a tank becoming empty of fuel or substantially so, and the fuel flowing to the carbureter through the fuel pump has been reduced a predetermined amount and to stop the operation of the electrical and mechanical means upon the fuel pressure being increased by the changing over from a tank which has become empty to a tank containing fuel. A modified form of the invention, which consists of providing an electric fuel gauge on each of the tanks including a fuel actuated float and a fuel tank selector valve commutator, is also included within the scope of the invention.

With the above and other objects and advantages in view, the invention consists of certain features of construction and operation of parts which will hereinafter appear and in which—

Fig. 1 is a side elevation partly in section of one form of the invention, applied to a vehicle having a plurality of fuel tanks;

Fig. 2 is an enlarged cross-sectional view of a valve used in carrying out the invention, taken on the line 2—2 of Fig. 1;

Fig. 3 is a sectional view taken on the line 3—3 of Fig. 1, and illustrating a part of the mechanism for actuating the valve;

Fig. 4 is an enlarged front elevation of a manual control and an indicator disk which may be used for manually controlling the valve;

Fig. 5 is a side elevation partly in section of a modified form of the invention;

Fig. 6 is a front view partly in section of a commutator with electrical circuits connected thereto shown diagrammatically, which is used in the modified form of the invention;

Fig. 7 is a top plan view of a fuel tank provided with an electric fuel gauge used in carrying out the modified form of the invention, and Fig. 8 is a vertical sectional view of the fuel tank and electric fuel gauge taken on the line 8—8 of Fig. 7.

In the illustrated embodiment characterizing the invention, the carbureter 1 of an airplane engine or the like, is connected to a fuel supply pipe 2, which leads from the carbureter to a fuel pump 3 and thence to a valve casing 4 having inlet ports 5, 6, 7 and 8 provided therein. The inlet ports 5, 6, 7 and 8 are connected in communication with a plurality of fuel tanks 9, 10, 11 and 12 by conduits 13, 13', 13" and 13'" respectively. Arranged within the valve casing 4, as illustrated in Fig. 2, is a rotary valve 14 having a fuel passageway 15 formed therein and with a centrally located outlet port 16 which is connected in communication with one end of the supply pipe 2. The fuel passageway 15 leads from the outlet port 16 to the outer periphery of the valve, whereby upon rotative movement of the valve, communication between one and then another of the fuel tanks with the carbureter 1 is readily established through the valve to the supply pipe 2 leading to the carbureter.

The valve 14 is mounted on one end of a valve control rod 17 which extends through an instrument panel 18 of the vehicle at its other end and has a handle 19 mounted thereon for manually controlling the valve into communication with one fuel tank and then another as desired. In order for the operator of the vehicle to manually select a particular fuel tank to be placed in communication with the supply pipe 2 through the valve and to determine the amount of movement of the valve for placing the fuel passageway 15 of the valve in communication with the tank selected, an indicating device 20 containing suitable indicia is provided, as illustrated in Fig. 4. In the present case the indicating device 20 is provided with the numerals 1 to 4 at an equal distance around the disk, representing the number of tanks being used in the system and the distance the valve 14 should be turned by the handle 19, for causing the fuel passageway 15 of the valve to be in communication with the tank selected, but it is readily understood that the disk may be provided with as many numerals as the number of fuel tanks employed providing the inlet ports of the valve casing 4 are increased in proportion.

To automatically actuate the rotary valve 14 with one form of the invention, as illustrated in Figs. 1, 2, 3 and 4, into communication with the fuel tanks of the vehicle, a fluid pressure operated switch 21 is provided which is connected in communication with the supply pipe 2 between the carburetor 1 and the fuel pump 3 by means of a conduit 22. The fluid pressure operating switch 21 comprises a casing 23 having a bellows 24 provided therein, which is provided at its bottom portion with an opening 25 connected in communication with the conduit 22. The upper end of the bellows 24 is closed and is provided with an upwardly extending conductor portion 26 containing an electrical contact 27 which is adapted to contact with another electrical contact 28 mounted on one end of a conductor rod 29. The electrical contacts 27 and 28 of the fluid pressure actuated switch 21 are provided for making and breaking an electrical solenoid circuit indicated generally by A, which is adapted to open and close a motor circuit indicated generally by B, and including an electric motor 30 which is in turn adapted to operate a mechanism generally indicated by C. The mechanism C is in turn adapted to rotate the control rod 17 for operating the rotary valve 14.

The electrical solenoid circuit A is connected to the fluid pressure operated switch 21 by a conductor 31 which is connected to the conductor portion 26 of the switch 21 and by a conductor 32 which is connected to the electrical conductor rod 29. The conductor 31 which is connected to the conductor portion 26 of the fluid pressure operated switch, is wound around a solenoid 33 containing a primary contact 34, from where it is connected to the positive side of a source of potential in the form of a battery 35 which is connected at its other or negative side to the conductor 32. In order to notify the operator of the vehicle that the pressure has dropped in the fuel system, a warning light 36 is connected across the conductor 31.

The primary contact 34 of the solenoid 33 is adapted to open and close the motor circuit B through a pair of second electrical contacts 37 and 38 provided in the motor circuit. The electrical contact 37 of the motor circuit is connected by a conductor 39 to a switch 40 which is in turn connected by a conductor 41 to a terminal 42 on the electric motor 30, and the contact 38 is connected by a conductor 43 to the positive side of a battery 44 which is in turn connected at its other or negative side by a conductor 45 to a terminal 46 of the motor. The motor 30 is mounted on a suitable framework 47 which is secured to a gear base 48 by bolts 49 or the like. The shaft 50 of the motor extends through the gear base 48 and is provided with a driving pinion 51 on the outer or free end thereof, which is adapted to mesh with an eccentric gear 52 rotatably mounted on the gear base by a shaft 53. The eccentric gear 52 is provided with a ratchet arm or dog 54 which is pivotally connected at one end by a pin 55 to one side of the eccentric gear closely adjacent to the outer periphery thereof. The outer or free end of the ratchet arm 54 is in the form of a hook 56 which is adapted to engage with notches 57 provided at equally spaced intervals on a ratchet gear 58 fixably mounted on the valve control rod 17. To guide the action of the ratchet arm 54 a suitable guide member 59 is secured to the gear base 48 and to hold the ratchet arm in operative engagement with the ratchet gear 58 a compression device 60 is provided which comprises a casing 61 suitably secured to the gear base 48 and having a spring pressed plunger 62 mounted therein containing a roller 63 on the outer end thereof which is adapted to be forced into a contacting engagement with the ratchet arm 54 by the spring pressed plunger 62.

In the operation of this form of the invention, assuming that the switch 40, which is provided in the motor circuit B, for disconnecting the automatic mechanism when starting the vehicle, has been closed, the tanks 9, 10, 11 and 12 having been filled with fuel and the valve 14 operated to cause the fuel passageway 15 thereof to be in communication with the first or main fuel tank 9, whereby the fuel in the tank is caused to flow through the conduit 13, through the inlet port 5 of the valve casing 4 into the fuel passageway 15 and outlet port 16 of the valve and thence into supply pipe 2, through the fuel pump 3 into the carburetor 1, some of the fuel in the supply pipe is forced by the fuel pump 3 into the bellows 24 of the fluid pressure operated switch 21 and as the fuel in the main tank 9 is used the amount of fuel which is delivered by the fuel pump 3 to the fuel operated switch is gradually reduced thereby causing the bellows 24 to gradually collapse until the electrical contact 27 of the fluid pressure switch 21 is moved downward sufficiently to contact with the electrical contact 28, thereby closing the electrical circuit A and causing the primary contact 34 of the solenoid 33 to be operated into contacting engagement with the contacts 37 and 38 of the electric motor circuit B. This operation closes the circuit B and causes the motor 30 to be operated by the battery 44 in the direction as indicated by the arrow in Fig. 3. As the motor 30 is operated the motor driving pinion 51 meshing with the eccentric gear 52 rotates the eccentric gear in the direction as indicated by the arrow which through its rotation pulls on the pivoted end of the ratchet arm 54 and causes the outer hook end thereof to engage one of the notches 57 of the ratchet gear 58, thus rotating the ratchet gear one quarter of a turn in the direction as indicated by the arrow. Upon the rotation of the ratchet gear in the direction of the arrow the valve control rod 17 is rotated in the same direction, thereby rotating the valve 14 and causing the fuel passageway 15 to come in communication with the inlet port 6 of the valve casing 4, which is connected in communication with the auxiliary fuel tank 10 by the conduit 13'. Upon an increase of fuel in the supply pipe 2 from the tank 10, the fuel pump 3 forces the fuel up into the bellows 24 of the fluid pressure operated switch 21 thereby causing the bellows to be expanded upwardly, which causes the electrical contact 27 of the fluid pressure operated switch to be moved upwardly out of contact with the electrical contact 28, thus breaking the solenoid circuit A and causing the primary contact 34 of the solenoid 33 to break away from the contacts 37 and 38 of the motor circuit B, stopping the motor and its connecting mechanism. Upon the second or auxiliary tank 10 becoming empty of fuel or substantially so, the operation is repeated until the fuel in the other auxiliary tanks 11 and 12 has been used.

The automatic operation of the fuel control system described above, does not interfere with the manual operation of the rotary valve 14 by means of the handle 19, except that the handle can only be turned in a clockwise direction for operating the valve through the rod 17.

In the modified form of the invention, each of the fuel tanks 9' to 12', as illustrated in Fig. 5, is provided with an electric fuel gauge 64, 65, 66 and 67 respectively. Each electric fuel gauge comprises a fuel actuated float 68 arranged within one of each of the tanks and secured to one end of a rod 69, the other end of the rod being connected to a bevel gear 70 which is mounted on a vertically extending support 71. The bevel gear 70 is mounted on the support 71 at the lower end thereof adjacent to the bottom of the tanks and is adapted to mesh with a bevel pinion 72 which is mounted on one end of a driven shaft 73. The bevel pinion 72 is provided with a small extension shaft 74 which extends vertically downward from the pinion and is rotatably mounted at its lower end to a horizontally extending portion 75 provided on the lower end of the support and suitably secured to the bottom of its respective tank, as illustrated in Fig. 8. The driven shaft 73 of the pinion 72 extends vertically upward from the pinion parallel with the support 71 and passes through the upper end of the tank. A contact arm 76 is secured at one end to the upper end of the driven shaft 73 and is adapted to contact with a substantially semi-circular rheostat resistance 77 at its other end. The rheostat resistance 77 and the contact arm 76 are mounted in a casing 78 on the upper end of each of the tanks and are adapted to be connected in circuit by conductors 79 and 80 respectively, with a fuel recording instrument (not shown) which may be mounted on the instrument panel 18 of the vehicle. The contact arm 76 is provided with an insulated finger 81 which is adapted to contact with a pair of resilient contact members 82, 82', 82'' and 82''', one pair of each of the resilient contact members 82 to 82''' being provided on one of each of the fuel gauges 64 to 67 respectively, and are connected in circuit with a fuel tank selector valve commutator 83, as illustrated in Figs. 5 and 6, and with a solenoid circuit which is adapted to open and close a motor circuit including the electric motor 30 which in turn is adapted to actuate the mechanism indicated generally by C, as heretofore described, for rotating the valve 14 through the fuel control rod 17.

The commutator 83 is fixably mounted on the inner side of the instrument panel 18 of the vehicle, being insulated from the fuel tank selector valve indicator 20 which is mounted on the opposite side of the instrument panel from the commutator. The valve control rod 17 projects through the center of the commutator 83 and the indicator 20 and terminates in the handle 19 mounted on the outer end thereof. The commutator 83 comprises an inner slip ring 84, which is insulated from an outer slip ring or contact segment 85 having a plurality of cut-out portions 86 provided therein, in one end of each of which cut-out portions 86 is mounted one of each of a plurality of contact buttons 87, 87', 87'' and 87''' respectively. An arm 88 containing an electrical contact 89 is fixably mounted by one end on the fuel valve control rod 17 and is adapted to be rotated by the valve control rod to cause the electrical contact 89 on the outer or free end of the arm to contact with the inner slip ring 84, and with one of the contact buttons 87 to 87''', during one point in the operation of the device, and with the inner slip ring and the outer slip ring 85 during another point in the operation of the mechanism, which will hereinafter be described.

One of each of the resilient contact members 82 to 82''' of the electric fuel gauges 64 to 67, is connected to one of each of the contact buttons 87 to 87''' of the commutator 83 by conductors 90, 91, 92 and 93 respectively, and one of each of the other resilient contact members is connected by one of each of a plurality of conductors 94, 94', 94'' and 94''' respectively, to a common return conductor 95 which is in turn connected with the outer slip ring 85 of the commutator 83 at 96. A conductor 97 connects the common conductor 95 with the negative side of a battery 98 and the positive side of the battery is connected by a conductor 99 which is wound around a solenoid 100 having a primary contact 101 provided thereon and is then connected to the inner slip ring 84 of the commutator at 102, as illustrated in Fig. 6.

The solenoid 100 is adapted to open and close an electric motor circuit by causing its primary contact 101 to contact with a pair of secondary electrical contacts 103 and 104 of the motor circuit for closing the motor circuit thus causing the motor 30 to be operated. The contact 103 of the motor circuit is connected to the positive side of the battery 98 by a conductor 105 and the contact 104 is connected by conductor 106 to a switch 107 which is in turn connected to the terminal 42 of the electric motor 30 by a conductor 108. The other terminal 46 of the motor is connected to the negative side of the battery 98 by a conductor 109. A warning light 110 which may be mounted on the instrument panel 18 of the vehicle for indicating that the automatic control system is in operation, is connected across the common conductor 95 and the conductor 99.

In the operation of this modified form of the invention assuming that the valve 14 has been rotated to the position as illustrated in Fig. 2, with the fuel passageway 15 thereof in communication with the inlet port 5 of the valve casing 4, which is connected in communication with the fuel tank 9' by the conduit 13 and that the arm 88 of the commutator 83 has been rotated by the valve control rod 17 to the position indicated in Fig. 6, with the electrical contact 89 on the outer end of the arm contacting with the contact button 87 of the commutator and with the inner slip ring 84 thereof, as the fuel in the tank 9' is used up through the supply pipe 2 leading to the carburetor 1, the float 68 in the fuel tank 9' is caused to move downwardly, thus rotating the bevel gear 70 which rotates the pinon 72 and hence the driven shaft 73, whereby the contact arm 76 on the upper end of the driven shaft is caused to be rotated in the direction as indicated in Fig. 7, until the insulated contact finger 81 on the contact arm contacts with the resilient contact members 82 of the fuel gauge 64. Upon the contact finger 81 contacting with the resilient contact members 82 the solenoid circuit is completed through the conductor 99 which is connected to one of the resilient contact members 82 and to the contact button 87 of the commutator 83, then through the electrical contact 89 of the arm 88, through the inner slip ring 84 of the commutator, to the conductor 99 and thence through the conductor 99 which is wound around the solenoid 100, and then to the positive side of the battery 98. The circuit is then completed from the negative side of the battery through the conductor 97 to the common return conductor 95 to the conductor 94 and thence to the other of the resilient contact members 82 of the fuel gauge 64.

The solenoid circuit being closed, the solenoid 100 is energized by the battery 98, thus operating the solenoid to cause the primary contact 101 thereof to contact with the contacts 103 and 104 of the motor circuit which closes the motor circuit and operates the motor 30. The motor circuit is completed from the positive side of the battery 98 through the conductor 105 to the electrical contact 103 through the primary contact 101 of the solenoid to the other contact 104 of the motor circuit, through conductor 106, switch 107, conductor 108 to the terminal 42 of the motor, then from the other terminal 46 of the motor, through the conductor 109 and thence to the negative side of the battery. The electric motor 30 is caused to rotate the eccentric gear 52 through the motor pinion 51, thus pulling on the ratchet arm 54 to rotate the ratchet gear 58 one quarter of a turn, which rotates the valve 14 a quarter of a turn through the rod 17, whereby the fuel passageway 15 of the valve is placed in communication with the inlet port 6 of the valve casing which is connected to the fuel tank 10' by the conduit 13', thus causing the fuel in the fuel tank 10' to pass through the valve to the supply pipe 2 leading to the carbureter 1 of the engine. As the valve control rod 17 is rotated, the arm 88 of the commutator 83 is also caused to be rotated in the same direction, as indicated by the arrow in Fig. 6, thus breaking the electrical connection between the contact button 87 of the commutator and the inner slip ring 84 thereof and causing the electrical contact 89 on the arm 88 to bridge the insulated space 111 and contact with the inner slip ring 84 and the outer slip ring 85 of the commutator, thus keeping the solenoid circuit completed through the outer slip ring 85 and the inner slip ring 84, the outer slip ring 85 being connected to the common return conductor 95 which in turn is connected to the negative side of the battery 98, and the inner slip ring 84 being connected by the conductor 99 to the positive side of the battery.

The solenoid circuit is caused to remain closed through the inner slip ring 84 and the outer slip ring 85 by the electrical contact 89 of the arm 88 until the arm has rotated a quarter of a turn in which case the electrical contact 89 slides off of the outer slip ring but remains in contact with the inner slip ring 84 and contacts with the contact button 87' of the commutator which is connected to one of the resilient contact members 82' of the fuel pressure gauge 65 on the fuel tank 10', the other resilient contact member 82' of the fuel pressure gauge 65 being connected to the common return conductor 95 by the conductor 94'. As the fuel tank 10' becomes empty the float 68 of the fuel pressure gauge 65 is operated, thus causing the arm 76 thereon to move the insulated contact 81 into contacting engagement with the resilient contact members 82' which closes the solenoid circuit which in turn closes the motor circuit to operate the motor 30 and its connecting mechanism, which again rotates the valve 14 a quarter of a turn and causes the fuel passageway 15 of the valve to be placed in communication with the conduit 13" leading into the fuel tank 11'. The arm 88 of the commutator 83 is also rotated a quarter of a turn into contact with the contact button 87" of the commutator.

This automatic operation of the system is continued until the fuel in the other fuel tanks 11' and 12' is used up. The solenoid circuit for the fuel gauges 66 and 67 on the upper end of the fuel tanks 11' and 12' respectively, is completed through the conductors 92 and 93, which are connected to one of each of the resilient contact members 82" and 82"' and to the contact buttons 87" and 87"' respectively of the commutator 83. The other contact of each of the resilient contact members 82" and 82"' of the fuel gauges 66 and 67 is connected to the common return conductor 95 by conductors 94" and 94"' respectively.

It will thus be seen that I have provided a highly novel and efficient form of fuel control system for vehicles which is well adapted for the purposes indicated and even though I have herein described certain features of construction and operation of parts, it is nevertheless to be understood that various changes may be made therein without departing from the spirit or scope of the invention.

Having described my invention, what I claim as new and wish to secure by Letters Patent is:

1. In a fuel supply system for aircraft and the like having a plurality of fuel containers, a main fuel supply conduit, branch conduits connecting the main conduit to the several containers, and automatic means adapted to be operated in response to the exhaustion of fuel from one container to connect another container to supply its fuel to the main conduit, said means including a rotary valve and means for imparting a step by step movement to the valve.

2. In a fuel supply system for aircraft and the like having a plurality of fuel containers, a main fuel supply conduit, branch conduits connecting the main conduit to the several containers, a multi-way rotary valve controlling the fuel delivery from the containers and means connected to impart a step by step rotary movement to said valve automatically to connect said containers in succession to supply fuel to the main conduit as the fuel supply in the respective containers is exhausted.

3. In a fuel supply system for aircraft and the like having a plurality of fuel containers, a main fuel supply conduit, branch conduits connecting the main conduit to the several containers, a multi-way rotary valve controlling the fuel delivery from the containers, a motor controlled mechanism connected to impart a step by step rotary movement to said valve, switch means controlling the mechanism and connected to be actuated in response to the exhaustion of the supply of fuel from any connected container to energize the motor of the mechanism and thereby operate the valve to connect another container to supply its fuel to the main conduit.

4. In a fuel supply system for aircraft and the like having a plurality of fuel containers, a main fuel supply conduit, branch conduits connecting the main conduit to the several containers, a multi-way valve controlling the fuel delivery from the containers, a motor connected to actuate said valve, a bellows connected to communicate with the main fuel conduit and adapted to contact when the fuel is being exhausted from any connected tank, and switch means controlled by the bellows and connected to energize the motor, whereby the motor operates the valve to connect another container to communicate with the main conduit and the fresh supply of fuel operating the bellows and switch to deenergize the motor.

5. In a fuel supply system for aircraft and the like having a plurality of fuel containers, a main fuel supply conduit, branch conduits connecting the main conduit to the several containers, a multi-way valve controlling the fuel delivery from the containers, a motor, ratchet means operated by the motor and connected to actuate said valve, switch means controlling the motor and connected to be actuated in response to the exhaustion of the supply of fuel from any connected container to energize the motor and thereby actuate the ratchet means for operating the valve to connect another container to supply its fuel to the main conduit.

6. In a fuel supply system for aircraft and the like having a plurality of fuel containers, a main fuel supply conduit, branch conduits connecting the main conduit to the several containers, a multi-way rotary valve controlling the fuel delivery from the containers, manual control means connected to operate said valve directly to connect said containers in succession to supply fuel to the main conduit, and a motor controlled mechanism connected indirectly with and adapted to impart a step by step rotary movement to the valve to connect said containers in succession to supply fuel to the main conduit as the fuel supply in the respective containers is exhausted.

7. In a fuel supply system for aircraft and the like having a plurality of fuel containers, a main fuel supply conduit, branch conduits connecting the main conduit to the several containers, a multi-way rotary valve controlling the fuel delivery from the containers, a motor controlled mechanism coacting with and adapted to impart a step by step rotary movement to said valve, a solenoid connected to control the operation of the motor of the mechanism, switch means controlling the solenoid and connected to be actuated in response to the exhaustion of the supply of fuel from any connected container to operate the solenoid and thereby energize the motor to operate the valve for connecting another container to supply its fuel to the main conduit.

8. In a fuel supply system for aircraft and the like having a plurality of fuel containers, a main fuel supply conduit, branch conduits connecting the main conduit to the several containers, a multi-way rotary valve controlling the fuel delivery from the containers, a motor controlled mechanism coacting with and adapted to impart a step by step movement to the valve, a float actuated switching means for controlling the motor of the mechanism and responsive to the supply of fuel in any connected container to energize the motor and thereby actuate the mechanism to operate the valve to connect another container to supply its fuel to the main conduit.

9. In a fuel supply system for aircraft and the like having a plurality of fuel containers, a main fuel supply conduit, branch conduits connecting the main conduit to the several containers, a multi-way valve controlling the fuel delivery from the containers, a motor, ratchet means operated by the motor, said ratchet means comprising an eccentric gear rotated by said motor, a ratchet arm pivotally connected to the eccentric gear, a ratchet gear connected to operate the valve and adapted to be rotated by said arm upon the operation of the eccentric gear by the motor, switch means controlling the motor and connected to be actuated in response to the exhaustion of the supply of fuel from any connected container to energize the motor and thereby rotate the eccentric gear for operating the arm and ratchet gear to operate the valve for connecting another container to supply its fuel to the main conduit.

10. In a fuel supply system for aircraft and the like having a plurality of fuel containers, a main fuel supply conduit, branch conduits connecting the main conduit to the several containers, a valve control rod, a multi-way valve mounted on said control rod for controlling the fuel delivery from the containers, a motor, ratchet means controlled by said motor and connected to rotate the valve control rod, an electric circuit including a solenoid, a source of potential for energizing said circuit, an electric circuit connected to said motor, a source of potential for energizing said second mentioned circuit, said second mentioned circuit adapted to be opened and closed by the solenoid of the first mentioned circuit, switch means connected to the first mentioned circuit and adapted to be actuated in response to the exhaustion of the supply of fuel from any connected container to close said first mentioned circuit to operate the solenoid to close the second mentioned circuit and thus energize the motor, whereby the motor operates the ratchet means for rotating the valve control rod to actuate the valve and connect another container in communication with the main conduit and the fresh supply of fuel from the container operating the switch, means to open the first mentioned circuit and thus deenergize the solenoid, thus opening the second mentioned circuit for deenergizing the motor and stopping the operation of the ratchet means controlled by the motor, a handle mounted to the rod for controlling the valve manually into communication with successive containers and an indicator for indicating the amount of movement necessary to place said valve into communication with the successive tanks.

11. In a fuel supply system for aircraft and the like having a plurality of fuel containers, a main fuel supply conduit, branch conduits connecting the main conduit to the several containers, a multi-way valve controlling the fuel delivery from the containers, a commutator including contact portions and an outer and inner slip ring, a contact arm adapted to remain in contact with the inner slip ring and to successively contact with said contact portions and the outer slip ring of said commutator, a mechanism connected to actuate said valve and contact arm, a motor connected to operate said mechanism, a float actuated switch means on each of said containers responsive to the fuel in the containers, circuit means connected to said motor and connecting each of the float actuated switch means of the containers with one of each of the contact portions of said commutator and with the outer and inner slip rings thereof, whereby upon the exhaustion of the supply of fuel in one of the containers, its respective float actuated switch means closes the circuit means to energize the motor through said circuit means to operate said mechanism for actuating the contact arm out of contact with the contact portion of said commutator which is connected to the float actuated switch means of the exhausted container and to successively cause the arm to contact with the contacting portion of the commutator which is connected to the float actuated switch means of the other containers containing fuel and with the outer slip ring of the commutator.

12. In a fuel supply system for aircraft and the like having a plurality of fuel containers, a main fuel supply conduit, branch conduits connecting the main conduit to the several containers, a multi-way valve controlling the fuel delivery from the containers, a commutator including contact portions and an outer and inner slip ring, a contact arm adapted to remain in contact with the inner slip ring and to successively contact with said contact portions and the outer slip ring of said commutator, a mechanism connected to actuate said valve and contact arm, a motor connected to operate said mechanism, a float actuated switch means on each of said containers responsive to fuel in the containers, circuit means connected to said motor and connecting each of the float actuated switch means of the containers with one of each of the contact portions of said commutator and with the outer and inner slip ring thereof, whereby upon the exhaustion of the supply of fuel in one of the containers, its respective float actuated switch means closes the circuit means to energize the motor through said circuit means to operate said mechanism for actuating the contact arm out of contact with the contact portion of said commutator which is connected to the float actuated switch means of the exhausted container and to successively cause the arm to contact with the contacting portions of the commutator which are connected to the float actuated switch means of the other containers containing fuel and with the outer slip ring of the commutator, means for manually controlling the valve and means for indicating the amount of movement necessary to place said valve into communication with the successive tanks.

13. In a fuel supply system for aircraft and the like, having a plurality of fuel containers, a main fuel supply conduit, branch conduits connecting the main conduit to several containers and means adapted to be operated in response to the exhaustion of fuel from one container to connect another container to supply its fuel to the main conduit, said means including a rotary valve for controlling the fuel delivery from the container, a rotary switch, a mechanism connected to impart a step by step rotary movement to the switch and valve, and separate means on each of said containers for controlling said mechanism.

14. In a fuel supply system for aircraft and the like, having a plurality of fuel containers, a main fuel supply conduit, branch conduits connecting the main conduit to the several containers, a rotary valve controlling the fuel delivery from the containers and means connected to operate said valve automatically to connect said containers in succession to supply fuel to the main conduit as the fuel supply in respective containers is exhausted, said means including a rotary switch, a motor controlled mechanism connected to impart a step by step rotary movement to said valve and switch and a float actuating switch means on each of said containers.

15. In a fuel supply system for aircraft and the like, having a plurality of fuel containers, a main fuel supply conduit, branch conduits connecting the main conduit with the several containers and means adapted to be operated in response to the exhaustion of fuel from one container to connect another container to supply its fuel to the main conduit, said means including a valve control rod, a multi-way rotary valve and rotary switch mounted on the control rod, a motor controlled mechanism connected to impart a step by step rotary movement to the valve control rod, valve and switch, a float actuated switch means on each of said containers and an electric circuit means connecting the said float actuated switch means to the rotary switch and motor.

EDWARD M. GAVIN.

DISCLAIMER 2,146,729.—*Edward M. Gavin*, Barksdale Field, La. AUTOMATIC FUEL CONTROL SYSTEM FOR VEHICLES. Patent dated February 14, 1939. Disclaimer filed March 31, 1942, by the inventor; the assignee, *The Aro Equipment Corporation*, approving.

Hereby enters this disclaimer to claims 1, 2, 3, 5, and 7.

[*Official Gazette April 28, 1942.*]

means of the exhausted container and to successively cause the arm to contact with the contacting portion of the commutator which is connected to the float actuated switch means of the other containers containing fuel and with the outer slip ring of the commutator.

12. In a fuel supply system for aircraft and the like having a plurality of fuel containers, a main fuel supply conduit, branch conduits connecting the main conduit to the several containers, a multi-way valve controlling the fuel delivery from the containers, a commutator including contact portions and an outer and inner slip ring, a contact arm adapted to remain in contact with the inner slip ring and to successively contact with said contact portions and the outer slip ring of said commutator, a mechanism connected to actuate said valve and contact arm, a motor connected to operate said mechanism, a float actuated switch means on each of said containers responsive to fuel in the containers, circuit means connected to said motor and connecting each of the float actuated switch means of the containers with one of each of the contact portions of said commutator and with the outer and inner slip ring thereof, whereby upon the exhaustion of the supply of fuel in one of the containers, its respective float actuated switch means closes the circuit means to energize the motor through said circuit means to operate said mechanism for actuating the contact arm out of contact with the contact portion of said commutator which is connected to the float actuated switch means of the exhausted container and to successively cause the arm to contact with the contacting portions of the commutator which are connected to the float actuated switch means of the other containers containing fuel and with the outer slip ring of the commutator, means for manually controlling the valve and means for indicating the amount of movement necessary to place said valve into communication with the successive tanks.

13. In a fuel supply system for aircraft and the like, having a plurality of fuel containers, a main fuel supply conduit, branch conduits connecting the main conduit to several containers and means adapted to be operated in response to the exhaustion of fuel from one container to connect another container to supply its fuel to the main conduit, said means including a rotary valve for controlling the fuel delivery from the container, a rotary switch, a mechanism connected to impart a step by step rotary movement to the switch and valve, and separate means on each of said containers for controlling said mechanism.

14. In a fuel supply system for aircraft and the like, having a plurality of fuel containers, a main fuel supply conduit, branch conduits connecting the main conduit to the several containers, a rotary valve controlling the fuel delivery from the containers and means connected to operate said valve automatically to connect said containers in succession to supply fuel to the main conduit as the fuel supply in respective containers is exhausted, said means including a rotary switch, a motor controlled mechanism connected to impart a step by step rotary movement to said valve and switch and a float actuating switch means on each of said containers.

15. In a fuel supply system for aircraft and the like, having a plurality of fuel containers, a main fuel supply conduit, branch conduits connecting the main conduit with the several containers and means adapted to be operated in response to the exhaustion of fuel from one container to connect another container to supply its fuel to the main conduit, said means including a valve control rod, a multi-way rotary valve and rotary switch mounted on the control rod, a motor controlled mechanism connected to impart a step by step rotary movement to the valve control rod, valve and switch, a float actuated switch means on each of said containers and an electric circuit means connecting the said float actuated switch means to the rotary switch and motor.

EDWARD M. GAVIN.

DISCLAIMER 2,146,729.—*Edward M. Gavin*, Barksdale Field, La. AUTOMATIC FUEL CONTROL SYSTEM FOR VEHICLES. Patent dated February 14, 1939. Disclaimer filed March 31, 1942, by the inventor; the assignee, *The Aro Equipment Corporation*, approving.

Hereby enters this disclaimer to claims 1, 2, 3, 5, and 7.

[*Official Gazette April 28, 1942.*]